Figure 1:
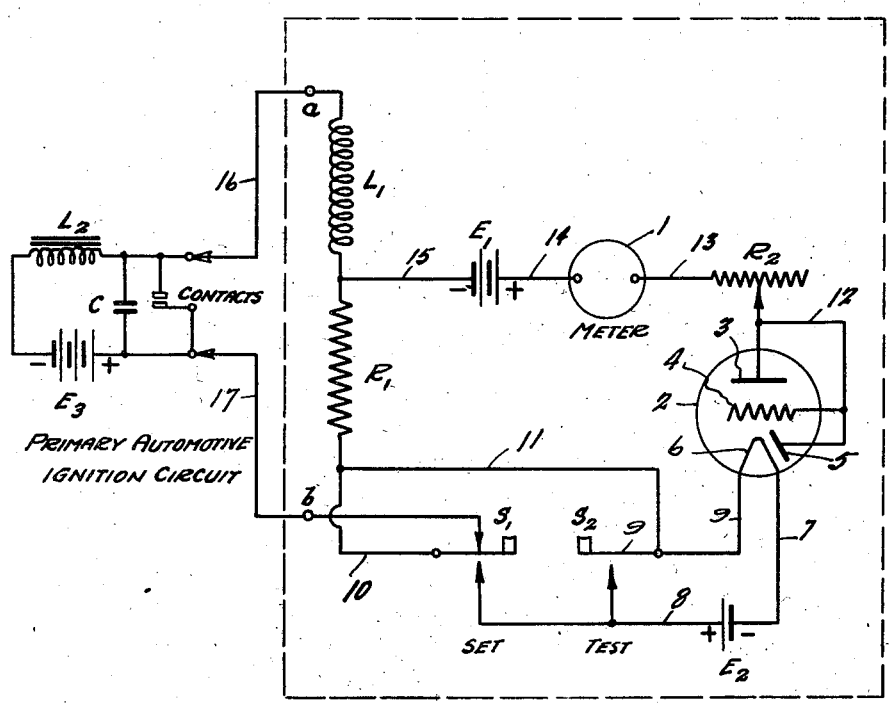

Aug. 12, 1947.　　J. W. HORTON　　2,425,321
IGNITION TESTING DEVICE
Filed Jan. 28, 1943　　2 Sheets—Sheet 1

Inventor
JOHN W. HORTON

Aug. 12, 1947.  J. W. HORTON  2,425,321
IGNITION TESTING DEVICE
Filed Jan. 28, 1943  2 Sheets-Sheet 2

Inventor
JOHN W. HORTON

By Semmes, Keegin, Beale & Semmes
Attorneys

Patented Aug. 12, 1947

2,425,321

UNITED STATES PATENT OFFICE 2,425,321

IGNITION TESTING DEVICE

John W. Horton, East Orange, N. J.

Application January 28, 1943, Serial No. 473,874

5 Claims. (Cl. 177—311)

This invention relates in general to automotive testing equipment and more particularly has reference to apparatus for use in determining the cam angle and condition of the breaker or contact points of an ignition system of an internal combustion engine.

In the tuning of internal combustion engines, it is necessary that the breaker or contact points be properly adjusted to obtain efficient performance. Some devices have been developed for this purpose, but these require the removal of the distributor from the engine or effect the test under non-operating conditions of the engine.

The principal object of this invention is to devise a method and apparatus for testing the ignition system of an internal combustion engine which avoid the disadvantages of the prior art.

Another object of this invention is to provide a method and apparatus for measuring the cam angle or ratio of the time of closure to the total or sum of the times of closure and opening of the breaker points of the ignition system of an internal combustion engine.

A further object of this invention is to provide a method and apparatus for determining the ratio of the contact resistance of the breaker points of an ignition system to the contact resistance of the whole primary circuit in which the contact points are included.

Still another object of this invention is to provide an apparatus for measuring the ratio of the time of closure to the total time of closure and opening of the breaker points of the ignition system of an internal combustion engine in which a circuit is provided having a meter, a source of potential, a resistance and a rectifier connected in series and in which means are provided for applying across the terminals of the resistance and in opposition to the potential from said source, the potential across the breaker points.

With these and other objects in view which will appear more fully hereinafter, the invention resides in the parts and combinations and in the procedure followed in testing ignition systems of internal combustion engines hereinafter described.

In the drawings:

Figure 1 of the drawings is a schematic view illustrating the primary circuit of an ignition system of an internal combustion engine connected to a test circuit embodying the principles of the present invention.

Figure 2:
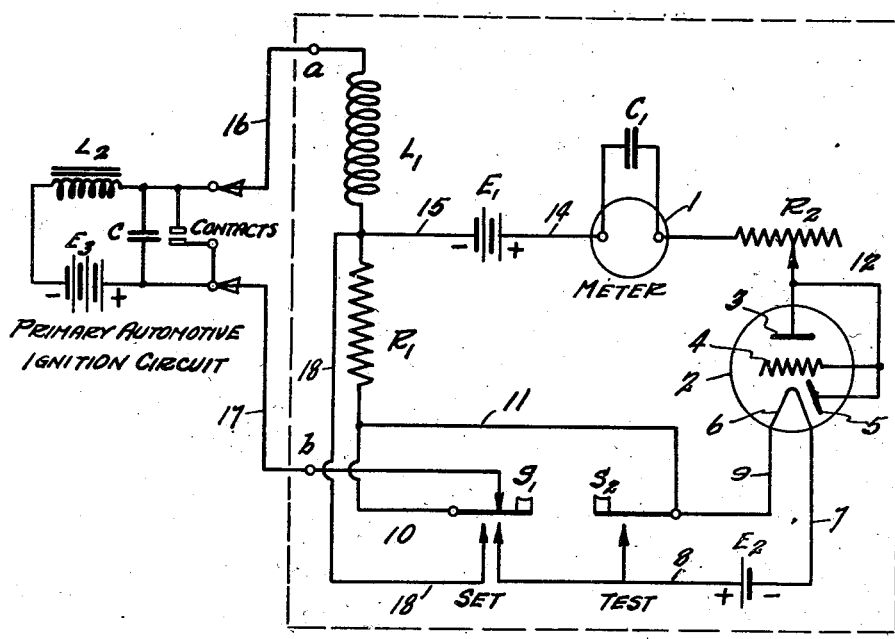

Figure 2 is a similar view embodying a modified form of test circuit.

As illustrated in the drawings, the apparatus for testing the ignition system in accordance with the present invention comprises a main test circuit which includes a meter 1, a source of potential or battery $E_1$, a resistance $R_1$, a rectifier element 2, and a variable resistance $R_2$, serially connected. The rectifier element 2 is in the form of a thermionic tube which is provided with a plate 3, a grid 4, a diode plate 5, and a cathode 6. In order to heat the cathode 6, one of the terminals of the cathode is connected by conductor 7 with the negative terminal of a source of potential such as a battery $E_2$ which in turn is connected through a conductor 8 to a switch $S_2$. The latter is connected by a conductor 9 with the other terminal of the cathode 6. Conductor 8 is also connected to one contact of a switch $S_1$ the movable element of which is connected by a conductor 10 to one terminal of resistance $R_1$ and to conductor 11 which in turn is connected with conductor 9. Thus, by depressing the movable element of either switch $S_1$ or $S_2$, the cathode 6 will be connected in a heating circuit which includes the source of potential $E_2$.

Plate 3 and grids 4 and 5 are connected together by conductor 12 which in turn is connected to the movable element of the resistance $R_2$. The other terminal of the resistance $R_2$ is connected by conductor 13 to one terminal of the meter 1. Conductor 14 connects the meter 1 to the positive terminal of battery $E_1$ and conductor 15 connects the negative terminal of battery $E_1$ to the other terminal of resistance $R_1$.

By closing either of the switches $S_1$ or $S_2$, the cathode 6 of the tube 2 will be energized which will cause current to pass in one direction through said tube. This passage of current will cause the meter to indicate and by adjusting the position of the movable element of the resistance $R_2$, the reading on the meter can be varied as desired.

The potential of the battery or other source $E_1$ may be different from that of the source or battery $E_2$ and the two sources $E_1$ and $E_2$ are so connected that the potential existing in the circuit may be represented by $E_1 + \frac{1}{2}E_2$. The polarity of the batteries $E_1$ and $E_2$ is so arranged in the circuit relative to the rectifier 2 that the latter will permit a current to flow under the total potential of $E_1 + \frac{1}{2}E_2$. This flow of current will actuate the meter 1 and by adjustment of the variable resistance $R_2$ a desired reading on the scale of the meter can be obtained. The sum of the voltages $E_1$ and $E_2$ is less than the potential across the breaker points of the distributor to be tested.

In utilizing the circuit above described for measuring the cam angle, or, in other words, the ratio of the time of closure of the breaker points of an ignition system to the total times of closure and separation thereof, one terminal of the resistance $R_1$ is connected through an inductance $L_1$ to a terminal $a$. A conductor 16 connects the terminal $a$ to the primary circuit of the ignition system between one of the breaker points and the coil $L_2$. The other terminal of the resistance $R_1$ is connected through conductor 10 and switch $S_1$ to a terminal $b$ which is in turn connected by a conductor 17 to the primary circuit of the ignition system at a point between the battery and the other breaker point. In other words, conductors 16 and 17 are in effect connected to the respective breaker or contact points.

As will be noted from the drawing, the primary circuit of the ignition system comprises the primary winding of the coil $L_2$, the battery $E_3$ and the breaker points, all of which are connected in series. Shunted across the breaker points is the condenser C. When the primary circuit of the ignition system is connected to the test circuit above described by the conductors 16 and 17 and the breaker points are opened, the potential of the battery $E_3$ is applied across the terminals of the resistance $R_1$.

Since the value of resistance $R_1$ is high compared to that of inductance windings $L_1$ and $L_2$, practically all of the potential of battery $E_3$ will be applied across resistance $R_1$. The application of the voltage $E_3$ across resistance $R_1$ will cause the applied voltage to oppose the potential $E_1 + \frac{1}{2}E_2$ of the test circuit and the effective voltage will be $E_3 - (E_1 + \frac{1}{2}E_2)$. This effective voltage will tend to cause current to flow in an opposite direction through the test circuit but due to the rectifier tube 2, this will be impossible and the meter 1 will read zero. Upon closing of the breaker or contact points, practically no potential from battery $E_3$ appears across the resistance $R_1$ and the effective potential in the test circuit is $E_1 + \frac{1}{2}E_2$. This will cause the meter to again indicate a value determined by the position of resistance $R_2$.

In operation, switch $S_1$ is closed and rheostat $R_2$ is adjusted to make the meter read full scale. Once this adjustment is made it need not be repeated for some time. Switch $S_2$ is then closed and the meter reading indicates on a calibrated scale the angle during which the breaker points are closed.

The theory of the operation is as follows: The "set" switch $S_1$ is depressed; this disconnects one lead connecting to the engine from the circuit and closes the filament circuit. In this case there is a series circuit containing resistances $R_1$, $R_2$ and the internal resistance of the meter and the tube, and also the voltage $E_1$ and a portion of $E_2$ (since the active portion of the filament is at a different potential than the terminal). The polarity of $E_1$ and $E_2$ are so chosen that the effective voltage in the circuit is $E_1$ plus approximately $\frac{1}{2}E_2$. Rheostat $R_2$ is then adjusted to give a meter reading of 100%.

When $S_1$ is released and $S_2$ is depressed the ignition circuit is connected to the instrument circuit and the filament circuit or cathode closed. Now, when the contact points are open and the ignition circuit is turned "on" $L_1$, $R_1$ and $L_2$ are connected in series across the battery $E_3$ and since $R_1$ is a high resistance compared to the reactance of $L_1$ and $L_2$ practically all of $E_3$ appears across $R_1$ and point "$b$" is positive with respect to point "$a$." The voltage across $R_1$ now appears in the calibrated meter circuit and is in an opposite direction to, and is greater than the other voltages in the circuit (i. e., $E_1 + \frac{1}{2}E_2$). The net resultant voltage in the circuit is now in a direction to pass current through the circuit from the filament of the rectifier tube to the plate. Since current cannot pass through the tube in this direction, no current flows and the meter reads zero. When the breaker points close practically no voltage appears across $R_1$ due to the battery $E_3$. (This voltage is not quite zero since the contact resistance is never zero, but always a small percentage of $E_3$ appears across the points.)

However, to illustrate the theory, it may be assumed that no voltage appears across $R_1$ due to battery $E_3$. In this case, the net voltages in the meter circuit are $E_1 + \frac{1}{2}E_2$ and the direction of this voltage is such that current flows from plate to filament. Since current does flow in this direction, the meter reads. In this perfect case, the meter will actually read slightly over the 100% mark since $R_1$ has been shorted out by the contacts. However, in practice, the contacts are not perfect but allow a percentage of voltage $E_3$ to appear across $R_1$ in such a direction as to reduce the meter reading slightly.

Selection of $R_1$ is made so as to compensate for normal contact resistance.

Since the meter reads 100% when the points are closed and 0% when the points are open and when the engine is running, this opening and closing takes place more rapidly than the meter pointer can follow. The pointer takes up a position corresponding to the relative length of time the points are closed to the total time open and closed.

Sources of voltage $E_1$ and $E_2$ may be dry cells or other batteries, the added potential of which is less than the potential of $E_3$.

The inductance $L_1$ has a dual purpose. First it acts as a high impedance to the oscillating frequency of the automotive primary circuit and thus does not place any load on the circuit. Secondly, it absorbs a large part of the high frequencies in the circuit and keeps them from affecting the meter circuit.

In a working model which operated effectively $L_1$ was 6 millihenries, 15 ohms, $R_1$ was 100 ohms, $E_1$ was 3.0 volts, $E_2$ was 1.5 volts and $R_2$ was adjustable from 0 to 1000 ohms.

In many instances it is desirable to measure the cam angle or the ratio of the time of closure of the breaker points to the total time of closure and separation in ignition systems of engines while operating at extremely low speeds such as 75 to 150 crankshaft revolutions per minute. At such low speeds the frequency of the impulses of current passing through the meter 1 when the breaker points are closed will be so low that the needle of the meter will appreciably fluctuate. It has been found that this fluctuation can be avoided by placing a high capacity condenser $C_1$ across the meter 1 as indicated in Figure 2 of the drawings. This condenser steadies electrically the current passing through the meter to such an extent that the meter still measures average current which is integrated by the makes and breaks of the breaker points and yet the wave form of the current is smoothed out to such an extent that the needle does not fall to any very great extent on low speeds such as just mentioned. This enables the instrument to be used with the distributor head off the breaker mechanism and the engine operated by the cranking battery. Under these conditions the breaker arm can be adjusted while it is in motion operated by the cranking battery. The capacity of the condenser used in the working model mentioned above was 1000 mfd.

When the condenser $C_1$ is used it is desirable to short circuit the resistance $R_1$ and for this purpose a conductor 18 extends from the end of wire 15 to a contact positioned for engagement by the switch arm $S_1$ when the latter is depressed for setting purposes.

Certain values of $R_1$ do not affect the setting of the circuit but when the condenser $C_1$ is employed it is better to cut out the resistance $R_1$ to obtain an accurate setting.

The circuit herein described may also be utilized for determining the ratio of the contact resistance of the breaker points to the contact resistance of the whole primary circuit.

With the leads 16 and 17 connected as described for cam angle tests and the meter adjusted to full scale, switch $S_2$ is closed when the engine is stopped with points in closed position and ignition on.

The contact resistance is a percentage of the total resistance in the automotive circuit and thus a percentage of the total voltage $E_3$ appears across the points and thus across $R_1$. This voltage across $R_1$ bucks the other voltages in the circuit and the meter reading will be less than 100% depending upon how much contact resistance exists. The scale can be calibrated so as to measure this percentage, assuming $E_3$ is a given constant voltage.

This circuit with the meter 1 connected as described provides an instrument which is very sensitive to small changes in contact resistance thus making it easy for an operator to determine when the breaker points need replacing or cleaning.

From the foregoing description, it will be realized that the present invention provides a method and apparatus for effectively determining the cam angle or ratio of the period of closure of contact points of an ignition system to the total length of time of closure and separation while the engine is in operation. This gives a more satisfactory test. Also, the present invention provides for an effective test of the contact resistance of the breaker points.

I claim:

1. An apparatus for determining the ratio of the length of time of closure to the total time of closure and separation of the contact points of an ignition system comprising a main circuit including in series connection an ammeter, a high resistance, a source of direct current potential less than the potential across said contact points, and a rectifier, means for imposing on said circuit in opposition to the source of direct current potential, the potential across the contact points to be tested, said means comprising a circuit separate from said main circuit and including in series connection the contact points, an inductance and said high resistance, said main circuit and the separate circuit being coupled through said high resistance.

2. An apparatus for determining the ratio of the length of time of closure to the total time of closure and separation of the contact points of an ignition system comprising a main circuit including in series connection an ammeter, a source of direct current potential less than the potential across said contact points, a rectifier and a high resistance, means for imposing across said high resistance in opposition to the source of direct current potential, the potential across contact points to be tested, said means comprising a circuit separate from said main circuit and including in series connection the contact points, an inductance and said high resistance, said main circuit and the separate circuit being coupled through said high resistance, said rectifier comprising a thermionic tube having an electrically heated cathode, and a separate source of potential for heating said cathode of a value less than and connected for addition to said source of direct current, the potential across the contact points being greater than the sum of the potentials of the other sources.

3. An apparatus for determining the ratio of the length of time of closure to the total time of closure and separation of the contact points of an ignition system comprising a main circuit including an ammeter, a source of direct current potential, a high resistance and a thermionic rectifier serially connected, said rectifier having an electrically heated cathode, a heating circuit for said cathode comprising a separate source of potential and a switch, an inductance, a switch and conductors for serially connecting said contact points, said inductance and said switch directly across the terminal of said high resistance to form a circuit coupled to said main circuit by said high resistance for imposing on said main circuit in opposition to the source of direct current potential, the potential across the contact points to be tested.

4. An apparatus for determining the ratio of the length of time of closure to the total time of closure and separation of the contact points of an ignition system comprising a main circuit including an ammeter, a source of direct current potential, a high resistance and a thermionic rectifier having an electrically heated cathode serially connected in the order recited and including means connecting one terminal of the high resistance to the cathode of the tube, a heating circuit for said cathode comprising a source of potential and a switch, means for imposing on said main circuit in opposition to the source of direct current potential, the potential across contact points to be tested including conductors for connecting the terminals of the high resistance across the contact points, switch means interposed between one of said conductors and one terminal of the high resistance, said last recited switch means being of the double throw type and operable to complete the heater circuit upon opening the connection between said conductor and high resistance terminal.

5. An apparatus for determining the ratio of the length of time of closure to the total time of closure and separation of the contact points of an ignition system comprising a main circuit including an ammeter, a source of direct current potential, a high resistance and a thermionic rectifier having an electrically heated cathode serially connected in the order recited and including means connecting one terminal of the high resistance to the cathode of the tube, a heating circuit for said cathode comprising a source of potential and a switch, means for imposing on said main circuit in opposition to the source of direct current potential, the potential across contact points to be tested including conductors for connecting the terminals of the high resistance across the contact points, switch means interposed between one of said conductors and one terminal of the high resistance, said last recited switch means being of the double throw type and operable to complete the heater circuit upon opening the connection between said conductor and high resistance terminal, and an inductance interposed between said other conductor and the other end of the high resistance.

JOHN W. HORTON.

REFERENCES CITED

The following references are of record in the file of this patent:

UNITED STATES PATENTS

| Number | Name | Date |
| --- | --- | --- |
| 2,312,840 | Lansdale | Mar. 2, 1943 |
| 2,244,717 | Lansdale | June 10, 1941 |
| 2,184,304 | Johnson et al. | Dec. 26, 1939 |